United States Patent
Mosing et al.

(10) Patent No.: US 7,513,537 B2
(45) Date of Patent: Apr. 7, 2009

(54) TUBULAR CONNECTION WITH SLOTTED THREADS

(75) Inventors: Donald E. Mosing, Lafayette, LA (US); David L. Sipos, Lafayette, LA (US); Jeremy R. Angelle, Lafayette, LA (US)

(73) Assignee: Frank's Casing Crew & Rental Tools, Inc., Lafayette, LA (US)

( * ) Notice: Subject to any disclaimer, the term of this patent is extended or adjusted under 35 U.S.C. 154(b) by 700 days.

(21) Appl. No.: 10/690,920

(22) Filed: Oct. 22, 2003

(65) Prior Publication Data

US 2005/0087985 A1 Apr. 28, 2005

(51) Int. Cl.
F16L 21/00 (2006.01)

(52) U.S. Cl. ..................................... 285/401

(58) Field of Classification Search ........... 285/391, 285/361, 360, 376, 401, 402, 333, 334, 390
See application file for complete search history.

(56) References Cited

U.S. PATENT DOCUMENTS

| | | | | |
|---|---|---|---|---|
| 55,354 | A | * | 6/1866 | Osgood ............... 285/391 |
| 193,166 | A | * | 7/1877 | Littlejohn ............ 285/391 |
| 222,713 | A | * | 12/1879 | Lawson ............... 285/349 |
| 444,676 | A | * | 1/1891 | Shull ................. 285/79 |
| 906,217 | A | * | 12/1908 | Gaylord .............. 285/391 |
| 1,325,468 | A | * | 12/1919 | Foster ................ 285/88 |
| 1,372,238 | A | * | 3/1921 | Kreiter ............... 285/89 |
| 1,469,009 | A | * | 9/1923 | Overstreet ........... 285/88 |
| 1,494,524 | A | * | 5/1924 | Adamson ............. 89/16 |
| 1,507,877 | A | * | 9/1924 | Wilson ............... 285/391 |
| 1,539,287 | A | * | 5/1925 | Wilson ............... 285/333 |
| 1,605,315 | A | * | 11/1926 | Wilson ............... 285/334 |
| 1,645,032 | A | * | 10/1927 | Wilson ............... 285/27 |
| 1,671,458 | A | * | 5/1928 | Wilson ............... 403/343 |
| 2,172,602 | A | * | 9/1939 | Williams ............. 403/343 |
| 2,673,751 | A | | 3/1954 | Finch |
| 3,421,580 | A | | 1/1969 | Fowler et al. |
| 3,442,536 | A | | 5/1969 | Fowler |
| 3,540,762 | A | * | 11/1970 | Dunlap ............... 285/391 |

(Continued)

FOREIGN PATENT DOCUMENTS

FR 0609086 * 8/1926 ............ 285/391

(Continued)

OTHER PUBLICATIONS

Dril-Quip, On-Line Catalog, Quick-Jay Connector, Copyright 2000 by Dril-Quip, Inc.

Primary Examiner—Vishal Patel
(74) Attorney, Agent, or Firm—Matthews, Lawson & Bowick, PLLC

(57) ABSTRACT

A connection for the quick and functionally reliable connection of tubulars including pipes and casing. The connection having a male or pin end and a mating female, box, or socket end and sections of circumferentially and axially extending protuberances such as thread segments or lugs interrupted by slots extending circumferentially and axially approximately the same distance as the corresponding protuberance section. Both the pin and box have matching or corresponding arrays of interrupted threads and slots. When properly aligned, the array will be accepted by a corresponding slot when mating the pin and box. After proper mating, the connection is secured by rotating the pin or box to further mate the corresponding patches of the pin and box.

20 Claims, 12 Drawing Sheets

U.S. PATENT DOCUMENTS

| | | | |
|---|---|---|---|
| 3,727,948 A * | 4/1973 | Current | 285/3 |
| 3,800,869 A | 4/1974 | Herd et al. | |
| 3,895,829 A | 7/1975 | Manson, Jr. | |
| 3,922,009 A | 11/1975 | Giebeler | |
| 3,948,545 A | 4/1976 | Bonds | |
| 3,971,576 A | 7/1976 | Herd et al. | |
| 3,989,284 A | 11/1976 | Blose | |
| 4,161,332 A * | 7/1979 | Blose | 285/334 |
| 4,185,856 A | 1/1980 | McCaskill | |
| 4,244,607 A | 1/1981 | Blose | |
| RE30,647 E | 6/1981 | Blose | |
| 4,324,049 A | 4/1982 | Blose | |
| 4,570,982 A | 2/1986 | Blose et al. | |
| 4,583,840 A * | 4/1986 | Yabu et al. | 355/30 |
| 4,600,224 A | 7/1986 | Blose | |
| 4,600,225 A | 7/1986 | Blose | |
| 4,629,221 A * | 12/1986 | Lumsden et al. | 285/328 |
| 4,662,659 A | 5/1987 | Blose et al. | |
| 4,757,860 A | 7/1988 | Reimert | |
| 4,822,081 A * | 4/1989 | Blose | 385/334 |
| 5,169,183 A * | 12/1992 | Hallez | 285/334 |
| 5,330,239 A | 7/1994 | Blose et al. | |
| 5,348,350 A | 9/1994 | Blose et al. | |
| 5,403,043 A | 4/1995 | Smet | |
| 5,423,579 A | 6/1995 | Blose et al. | |
| 5,468,029 A | 11/1995 | Blose et al. | |
| 5,498,035 A | 3/1996 | Blose et al. | |
| 5,709,416 A * | 1/1998 | Wood | 285/330 |
| 5,810,401 A | 9/1998 | Mosing et al. | |
| 6,010,163 A | 1/2000 | Cerruti | |
| 6,047,997 A * | 4/2000 | Olivier | 285/333 |
| 6,056,324 A | 5/2000 | Reimert et al. | |
| 6,120,067 A | 9/2000 | Mosing et al. | |
| 6,283,511 B1 | 9/2001 | Kamp | |
| 6,322,110 B1 | 11/2001 | Banker et al. | |
| 6,485,061 B1 | 11/2002 | Mosing et al. | |
| 6,485,063 B1 | 11/2002 | Olivier | |

FOREIGN PATENT DOCUMENTS

| | | | |
|---|---|---|---|
| FR | 1074149 | * 10/1954 | 285/391 |
| GB | 0242501 | * 11/1925 | 285/391 |
| GB | 0566270 | * 12/1944 | 285/391 |

* cited by examiner

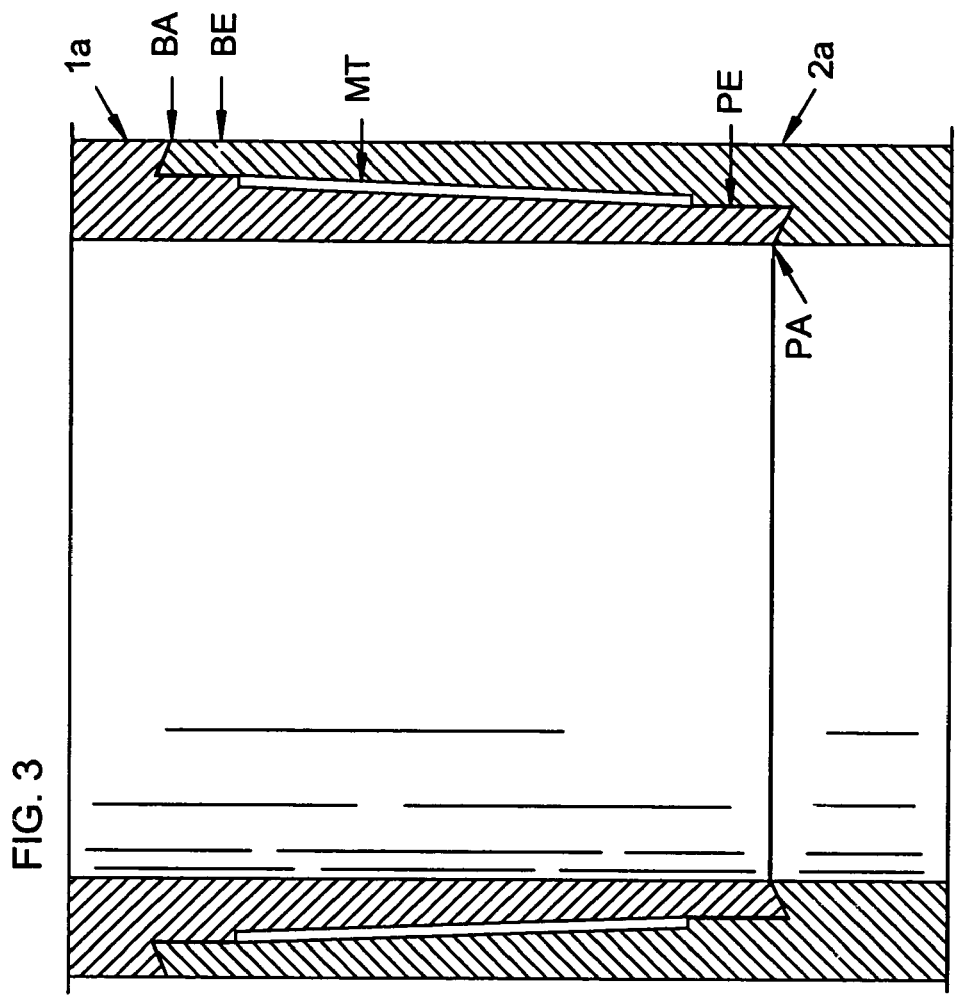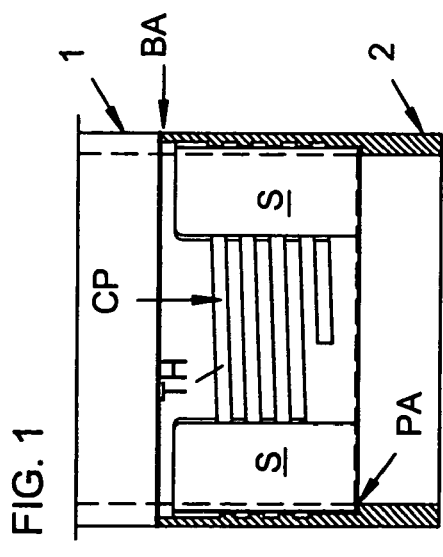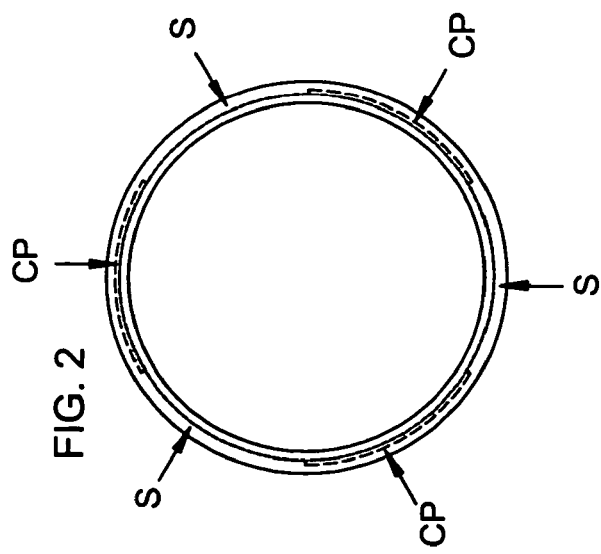

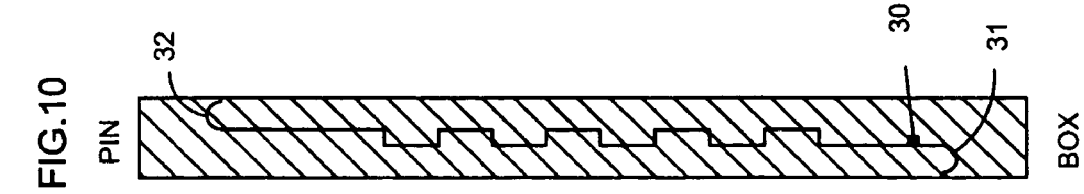
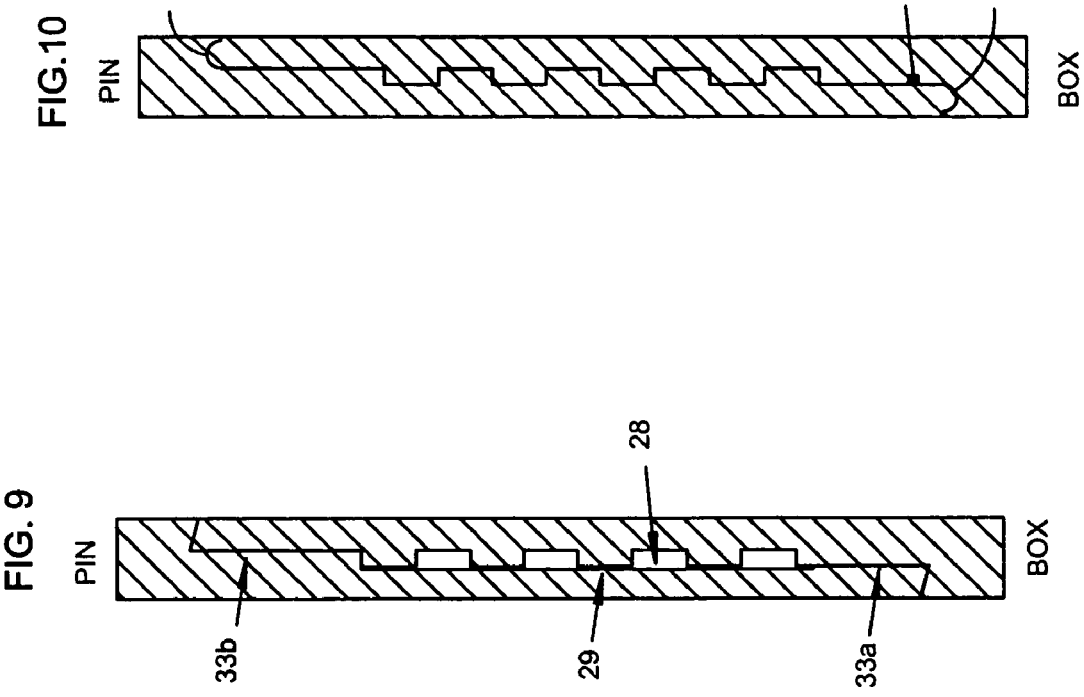
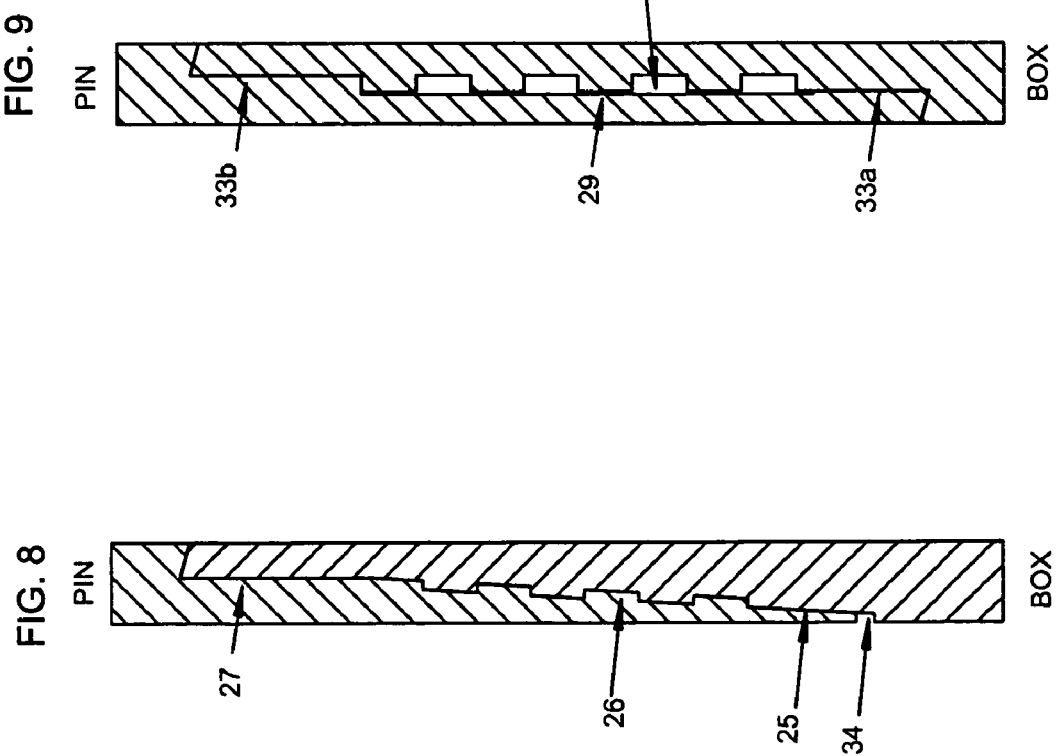
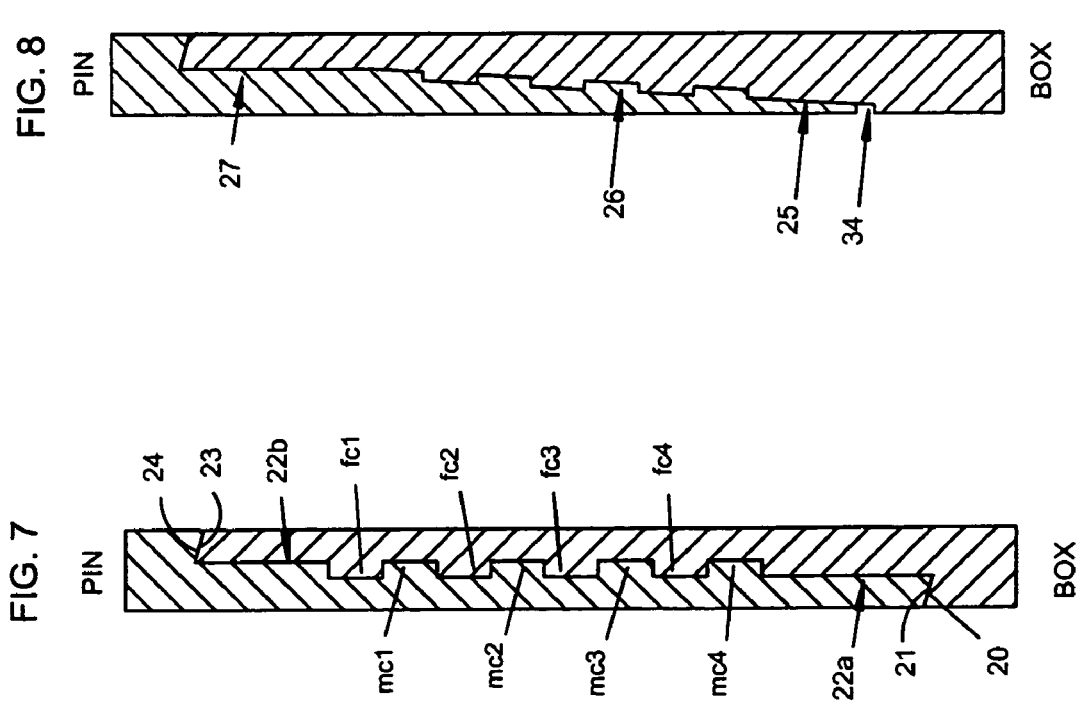

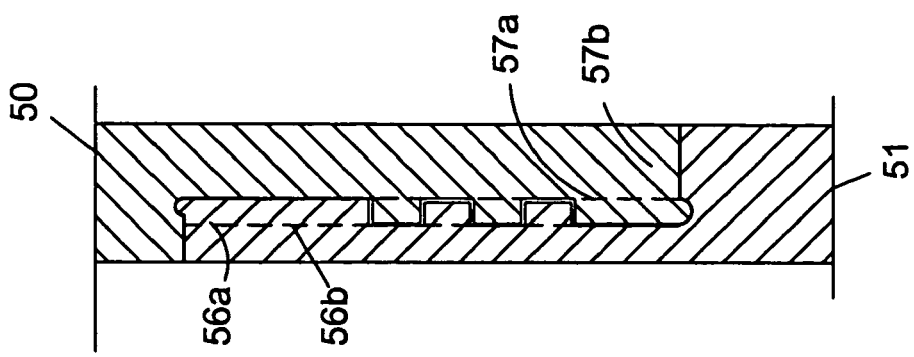
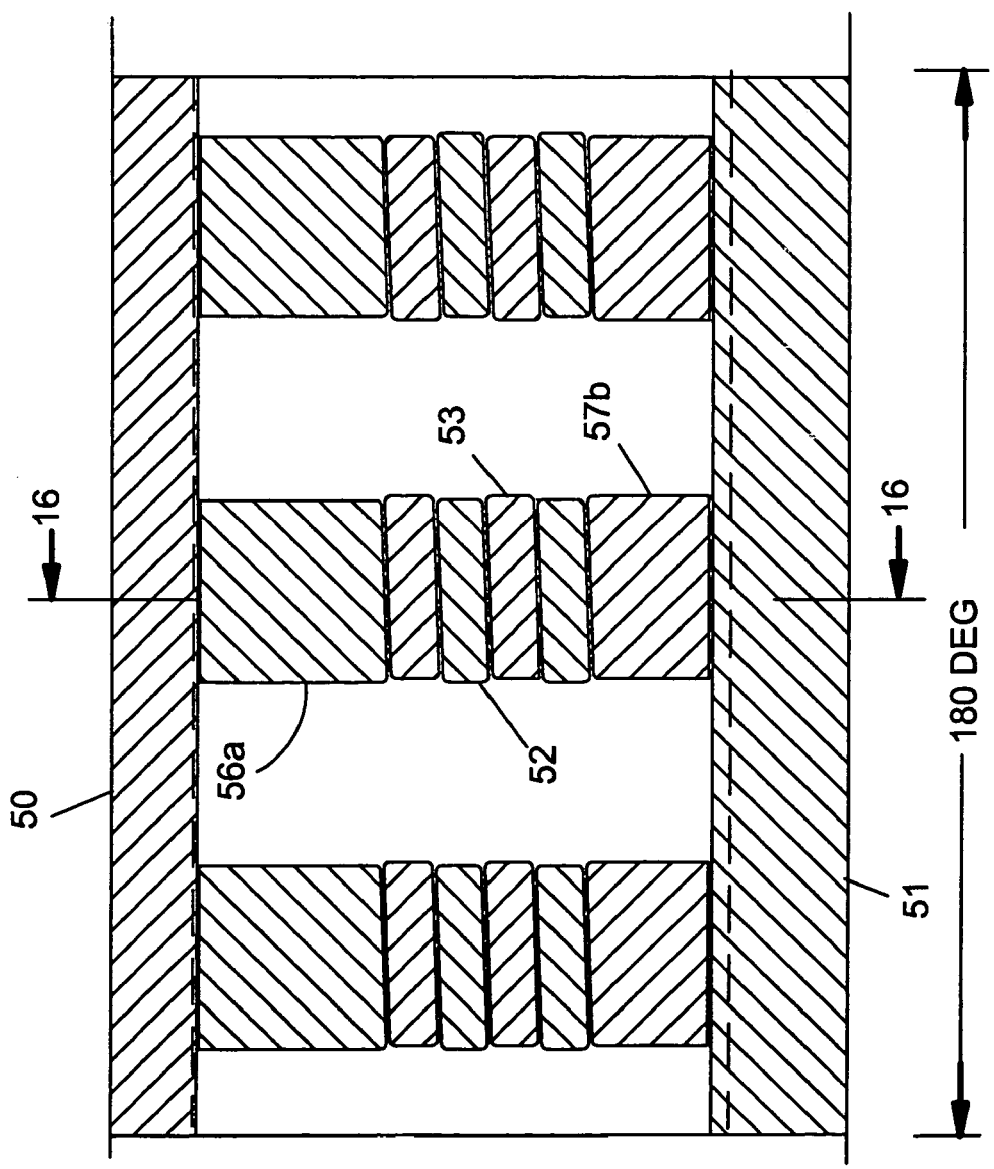

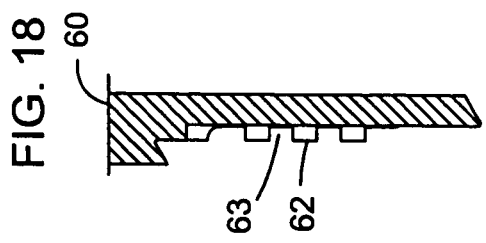
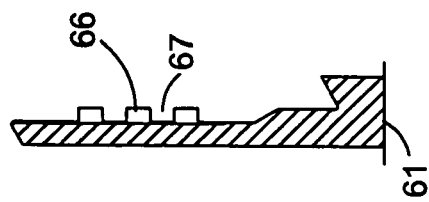
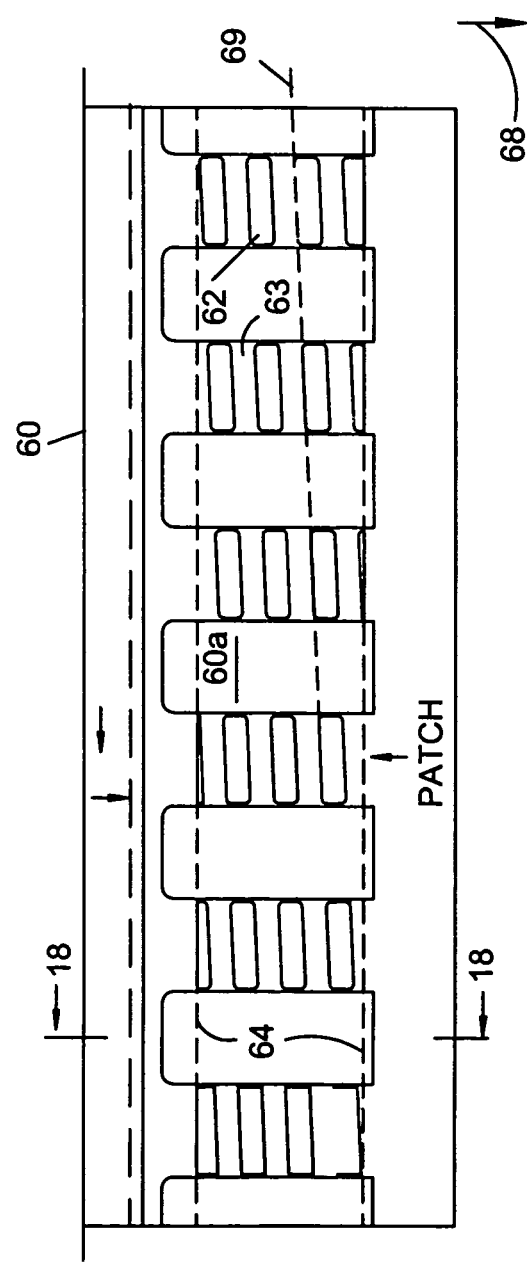
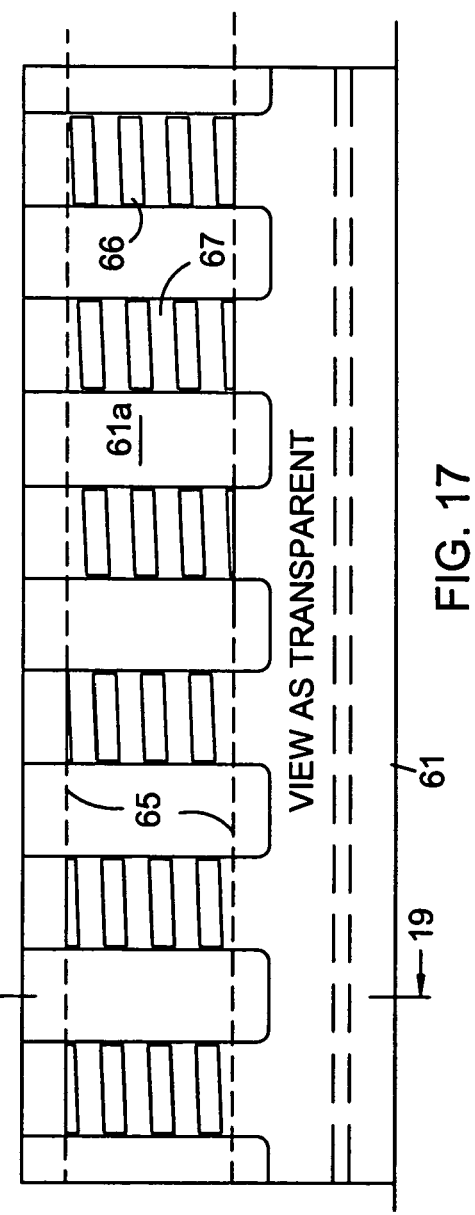

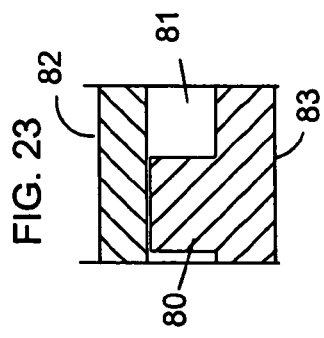
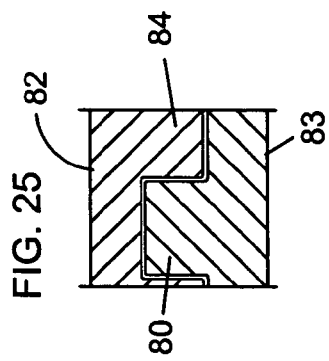
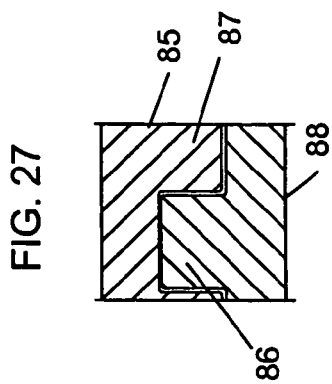
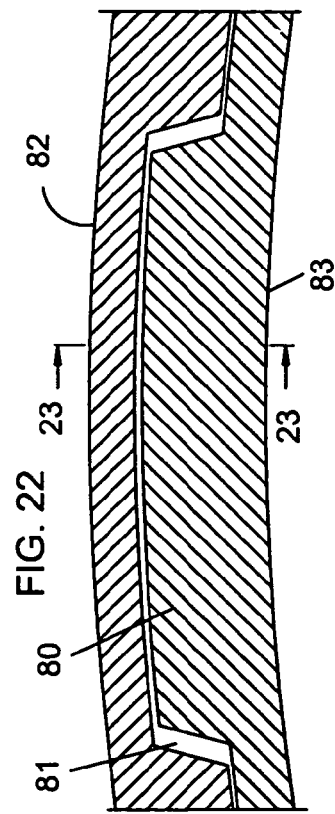
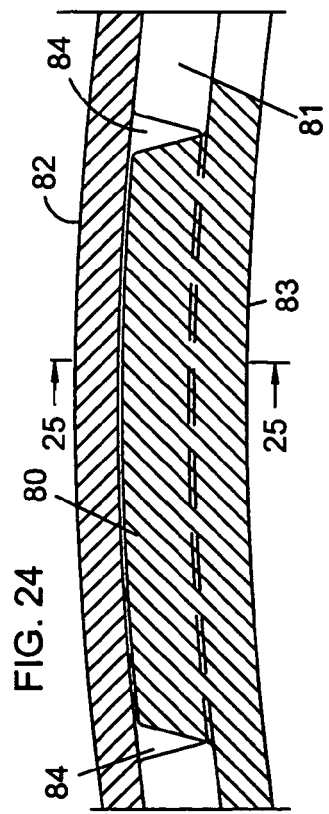
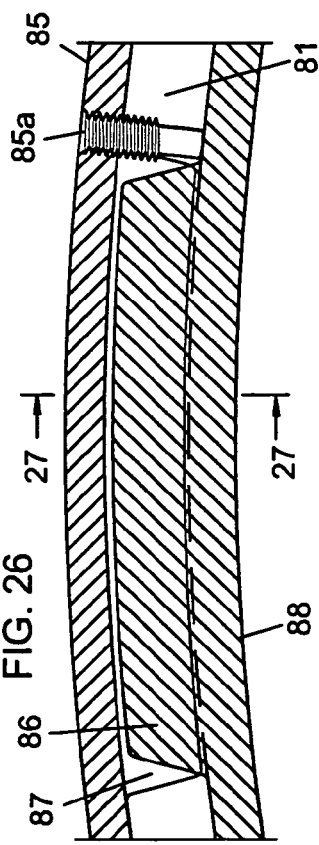

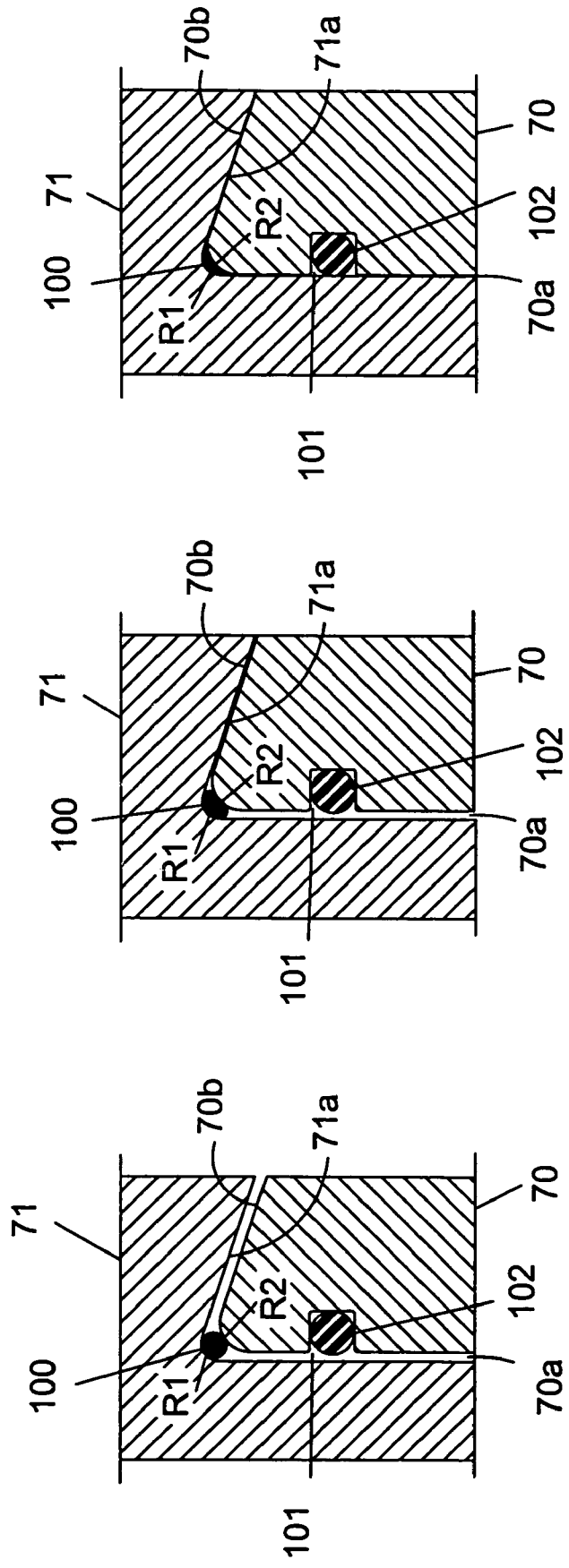

180# TUBULAR CONNECTION WITH SLOTTED THREADS

BACKGROUND OF THE INVENTION

Field of the Invention

The present invention relates generally to assembling pipe sections together to produce, among other things, a pipe string and, more particularly, to assembling pipe strings by use of interrupted or slotted threads by which small partial turns of one pipe portion relative to the other completes the individual connection.

BRIEF DESCRIPTION OF THE DRAWINGS

FIG. 1 is a side elevation, partial cut away of a pin and box connector.

FIG. 2 is an end view of FIG. 1, viewed from below.

FIG. 3 is a side view cut-away of a box and pin connector illustrating taper threads.

FIG. 7 is similar to FIG. 6 but illustrating another embodiment of the present device.

FIG. 8 illustrates another embodiment of the present device.

FIG. 9 illustrates another embodiment of the present device.

FIG. 10 illustrates another embodiment of the present device.

FIG. 15 represents a 180 degree plan view of a section of an embodiment of the pipe connection.

FIG. 16 is a sectional view taken along line 16-16.

FIG. 17 represents an unfolded plan view of one embodiment of a pin and box aligned for mating.

FIG. 18 is a sectional view taken along line 18-18.

FIG. 19 is a sectional view taken along line 19-19.

FIG. 22 is a partial sectional view illustrating a thread segment in a slot.

FIG. 23 is a sectional view taken along line 23-23.

FIG. 24 is a partial sectional view of a non-interfering thread segment in a mating groove.

FIG. 25 is a sectional view taken along line 25-25.

FIG. 26 is a partial sectional view illustrating the use of a set screw to prevent rotation.

FIG. 27 is a partial sectional view illustrating the interference of the mating crest and root.

FIG. 32 is a sectional view of a selected area illustrating seals uncompressed.

FIG. 33 is similar to FIG. 32, with the seal more compressed.

FIG. 34 is similar to FIG. 32, with the seal fully compressed.

Figure 4A:
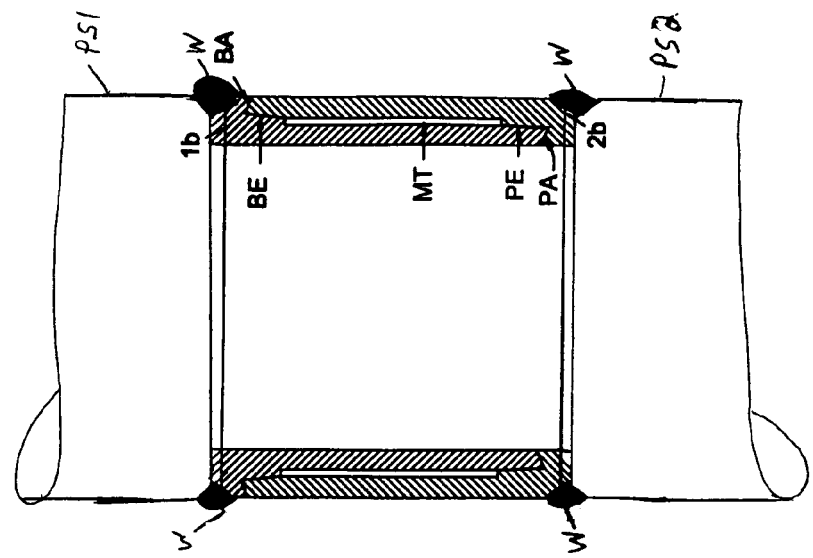
FIG. 4 is similar to FIG. 3 but illustrating straight threads.

While the present invention will be described in connection with presently contemplated embodiments, it will be understood that it is not intended to limit the invention to those embodiments. Further it should be understood that the drawings used to illustrate these embodiments are also not intended to limit the present invention but are intended to disclose the presently contemplated embodiments. These descriptions and drawings are intended to cover all alternatives, modifications, and equivalents included within the spirit of the invention.

DETAILED DESCRIPTION OF PREFERRED EMBODIMENTS

The connections to be described herein may be produced in the ends of pipe segments which are preferably but not exclusively installed in a pipe string or can be produced as a short ring, or length of pipe which is then attached to the pipe segment preferably but not exclusively by welding.

The interrupted threads to be described herein can be produced by removing sections of threads on a threaded connection or can be produced by machining, milling, or a similar process. It should be appreciated that the protuberances or thread segments, or shorter pieces of the original thread that remain after a portion of the threads are cut away or that are otherwise produced in or on the pipe ends or attachable pipe segments are referred to as interrupted threads, partial threads, lugs, cams, threads, protrusions, protuberances, thread segments and the like. These terms should not be distinguished based on method of production. As an example, whether a protuberance is produced as a result of removing a portion of an existing thread or by machining or milling operations when no thread exists, the protuberance (or multiple protuberances) would be within the scope of this invention regardless of the term describing it. It should be further appreciated that there are a large variety of synonyms for these protuberances and the arrays of the protuberances that are formed by cutting away sections of the threads or that are otherwise produced in or on the pipe ends or attachable pipe segments. Substantially the same synonyms are used when these protuberances or thread segments are the result of machining, milling, or similar operations to produce the pipe end configurations. The grouping of these protuberances is typically referred to as arrays, circumferential arrays, patches, cam patches and the like. The areas between the arrays of protuberances are typically referred to as slots or other synonymous names. These terms are used interchangeably herein to aid those in the art with a more complete understanding of the present invention. Thus, the name applied to these protuberances, arrays of protuberances, or areas between the arrays is not intended to limit the present invention.

FIGS. 1, 2, and 3 relate to embodiments of the connection form. Pipe section 1 is joined to pipe section 2. FIGS. 1-5 define the general areas of the connection rather than individual features. The pin end has an array of interrupted threads or protuberances CP between slots S. In one embodiment, slot S is a circumferential cut-out that just removes the threads on three places on the pin circumference. Similar cut-outs are made in the box threads. The slots on each part will accept, in axial movement, the thread segment arrays on the other part. The thread element TH extending circumferentially across an array is the protuberance which can be a partial thread, an interrupted thread, a thread segment, a cam, a lug or a similar protrusion. When the parts move axially together for pipe string assembly, abutment BA will be in contact with the pin and abutment PA will be in contact with the box. It should be appreciated that the terms pin and box refer to a male end connection and female or socket end connection respectively. When threads are dynamically loaded by pile driving, the stab flank gets loaded by shock. Therefore, the stab flank is sometimes referred to as the shock flank. Connecting configurations that have sufficient shoulder, or abutment, area may not shock load the threads.

Pipe segments subject to pile driving have a diameter to wall thickness ratio that varies considerably. Different ratios require different threads. Some ratios require abutments capable of accepting pile driving loads borne by the abutments alone, with threads accepting the rebound energy. In some cases threads alone carry the shock load and no separate abutment is involved.

FIG. 3 shows box end 2a and pin end 1a with box extension BE and pin extension PE separated by mating thread length MT. The thread length is slightly tapered and the box and pin extensions are cylindrical.

Figure 4:
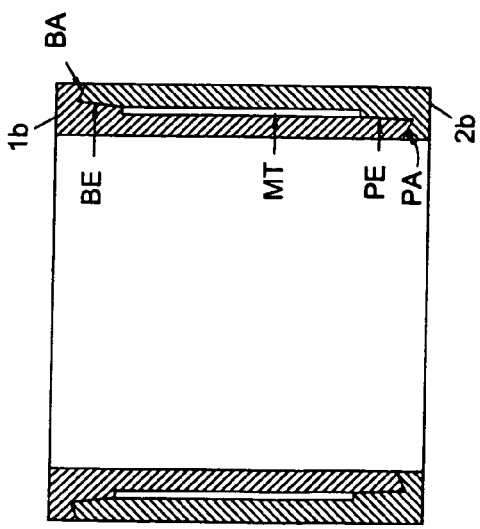

In FIG. 4, another embodiment, the threaded length MT is generally straight and the extensions are generally conical. Considering the connection as a box and pin arrangement, abutting shoulders are preferably provided at each end of the threaded engagement portion. In effect the threads or protrusions, pull the shoulders into abutment. The preferred abutments are shaped to prevent the radial separation that axial impacts tend to cause. Both straight and tapered threads are disclosed with the present novel features. Thread forms preferred are square, buttress, and entrapment with the choice influenced by factors including pipe wall thickness and the ratio of diameter to wall thickness of the pipe. The abutments BA and PA have different amounts of taper. As an option, either or both of the extensions can have interference fits to seal the bore or to provide rotational restraint to prevent unscrewing the connection when the hammering takes place. The extensions shown, if tapered as shown, are tighter under hammer blows that typically loosen the load flank of the thread segments. It should be noted that the shock load on the abutments cause the thinner pipe mating part to be thrust toward the nearest radially restraining surface. It should be understood, as illustrated in FIG. 4A, that pipe ends 1b and 2b may be rings to be welded W to other pipe segments PS1,PS2.

Figure 5:
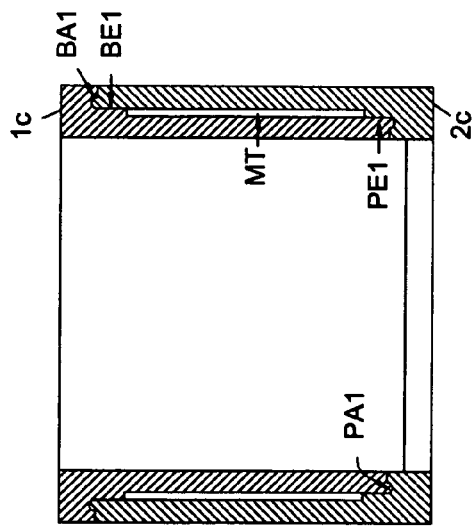
FIG. 5 is a side view cut-away of another embodiment of the present device.

FIG. 5 is very much like FIG. 4 but the radial restraint configurations of the abutments BA1 and PA1 have different entrapment configurations. Likewise, pipe ends 1c and 2c may be short rings to be attached later to the ends of pipe sections. Extensions BE1 and PE1 may be straight as shown or tapered as in FIG. 4.

Figure 6:
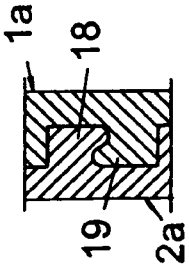
FIG. 6 is a sectional view of one wall of a connector illustrating an entrapment thread profile.

When threads are used with thin walled pipe, the hammering effect on the pipe wall near the connection shoulders can deform the material radially. The result is generally failure. The threads can be shaped to radially urge mating parts together. Such thread sections are called capture or entrapment threads. The thread section is preferably a dove tailed shape. If less radial security is required, only one flank can be shaped for the entrapment. FIG. 6 illustrates an embodiment with thread entrapment profiles 18 and 19, useful for piping connections for wall thicknesses within certain ranges. The illustration here shows an optional hook pattern used on one flank. Thinner wall piping may require a hook profile on both flanks. It should also be appreciated that other forms of entrapment threads can also be utilized.

An embodiment of the present disclosure involves a coupling that usually has unthreaded axial extensions, extending in both axial directions from the threaded length, useful for alignment and sealing. Those continuing surfaces may be cylindrical or conical, or a combination of both when used with straight or tapered threads. FIGS. 7-10 illustrate various embodiments of the present device and illustrate sections through one wall of a pipe segment joined by different configurations typically selected for certain pipe wall thicknesses. It should be understood that while only simple thread forms are illustrated, a variety of thread forms and combinations could be used.

FIG. 7 illustrates an embodiment with a pin and box wall joined with mating cylindrical surfaces 22a and mating cylindrical surfaces 22b on opposite axial sides of mated interrupted thread arrays. Female thread segments fc1-fc4 mate with male thread segments mc1-mc4. A section cut through the center of any one of a plurality of arrays would be identical. With the configuration shown, surface 22a extends generally from the root dimension of the pin thread and surface 22b extends generally from the root dimension of the box thread. With this configuration, the slots do not have to extend into surfaces 22a or surfaces 22b. The conical abutments 20 and 21 plus conical abutments 23 and 24 often suffice for shock loads of pile driving without the need for entrapment thread forms. The thread arrays usually have a slight conical form with the crest diameters typically increasing, between the lands, towards the nose of the box.

FIG. 8 illustrates an embodiment of the connection with only one driving abutment pair of mated surfaces similar to surfaces 23 and 24. Arrays on length 26 have substantial taper and mating conical surfaces 25 can have substantial interference for rotational security to prevent loosening by pile driving shock. Interferences of surfaces on length 26 are increased by axial compression due to driving shock. Gap 34 does not need to close and resilient seals may or may not be required depending on the application the device is utilized in.

FIG. 9 is quite similar to FIG. 7 but illustrates an embodiment with the slot 28 on the pin and the array 29 on the box. Axial relative movement can be almost complete before the relative rotation of final joining takes place. Either or both mating surfaces 33a and 33b can be somewhat conical and either or both may carry seals such as 30 of the embodiment illustrated in FIG. 10.

FIG. 10 illustrates an alternate form of abutment, 31 and 32, that radially secures one abutting surface to the other to keep the pipe segment from radially over-expanding at the ends during driving. Seal 30 is typically not necessary but some companies routinely require them.

Figure 11:
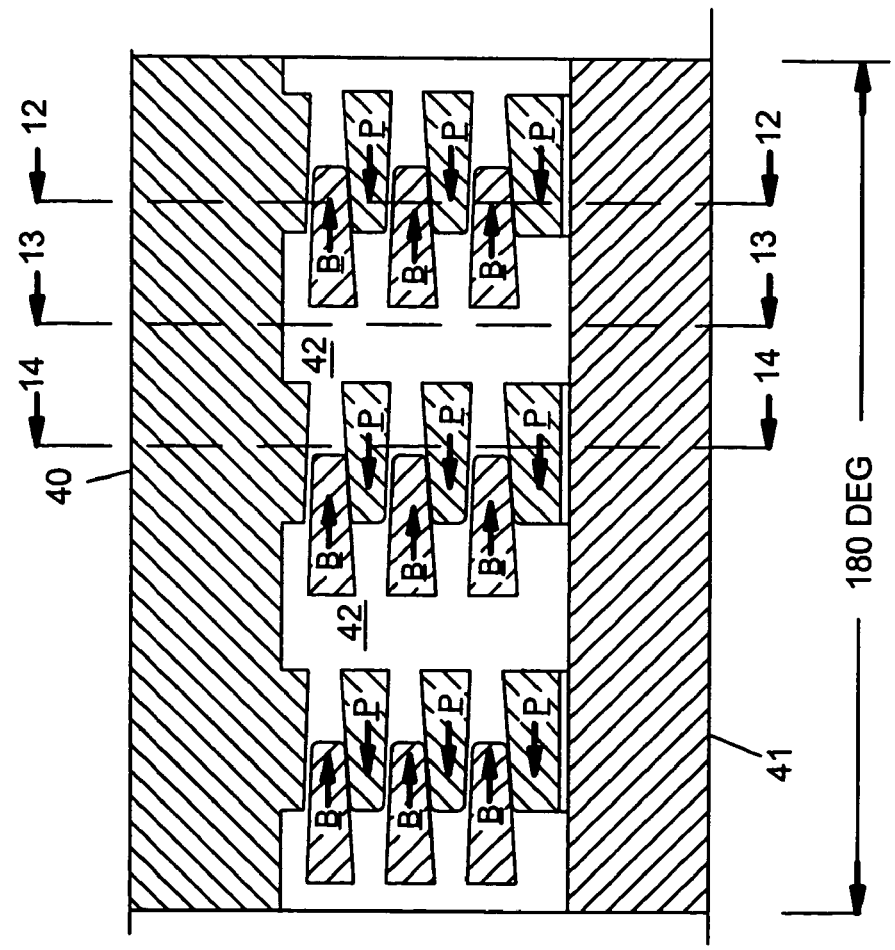
FIG. 11 represents a 180 degree plan view of a section of an embodiment of the pipe connection.
Figure 31:
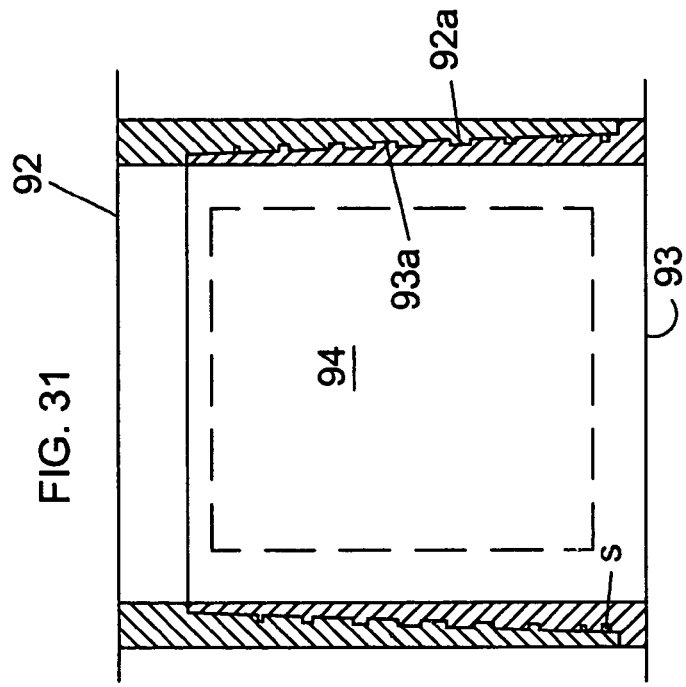
FIG. 31 is a side view cut-away of a connector using wedge threads.

FIG. 11 is a 180 degree plan view of an embodiment of a mated pin and box connection. This illustrates a six phase pipe connection using lugs or partial thread segments not produced by threads. To wedge the threads together for maintaining tightness, each partial thread can be independently shaped or all of them can be collectively shaped by a parent thread cut in a long wedge shape as illustrated in FIG. 31. The helical angle of the stab flank differs from the helical angle of the load flank. Such partial threads can also utilize the entrapment forms defined above. Pin threads P and box threads B, move in the direction of the arrow for tightening. The interrupted threads or protuberances are wedge shaped, the angle being exaggerated, to pinch all flanks as tightening proceeds.

Figure 14:
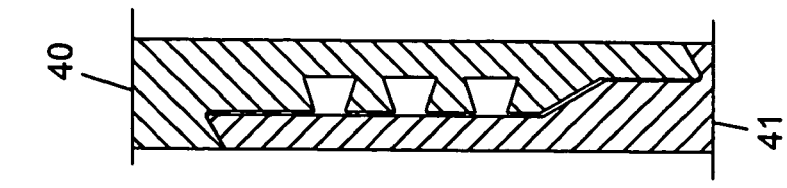
FIG. 14 is a sectional view taken along line 14-14.
Figure 13:
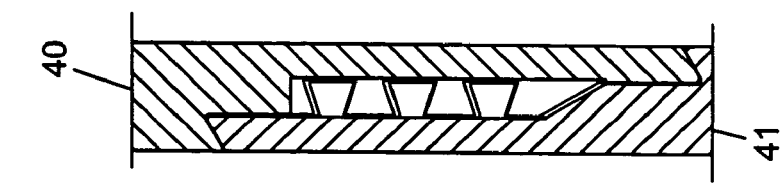
FIG. 13 is a sectional view taken along line 13-13.
Figure 12:
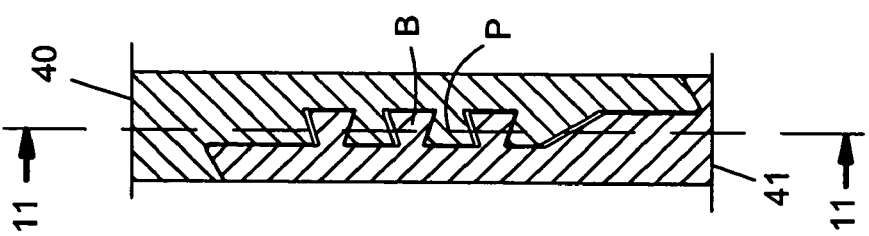
FIG. 12 is a sectional view taken along line 12-12.

Pin 40 is drawn into box 41 by tightening of the connection. The load flanks of thread segments B and P are sloped to provide the specified compression with the amount of relative rotation that brings the thread arrays into maximum engagement. The stab flanks of the threads are sloped to achieve rated torque when the thread arrays are in maximum engagement. This arrangement can be used with any thread segment section profile and the wedging action improves the function of entrapment profiles on the thread segments. When thread segments, not produced by cutting away threaded sections, are used the total effect of the described wedge made of one long thread can be achieved on each short thread segment. The wedging effect, is then achieved in only a fraction of one turn. In such an embodiment, all thread segments can be alike and equally strong. FIGS. 12-14 illustrate the relationships of features of FIG. 11 at three section stations.

FIGS. 15 and 16 illustrate an embodiment having a high load bearing surface arrangement. FIG. 15 illustrates an 180 degree plan view of a mated pin and box connection. Box 51 has thread segments 52 in six equally spaced arrays (three shown) separated by six slots. Pin 50 has thread segments 53 which mate with thread segments 52. This design provides high load bearing area on mating surfaces. It should be understood that although the thread segments are illustrated with one particular thread form other forms can be used. Masses 56*a* and 57*a* increase the load bearing material between slots. Surfaces 56*b* and 57*b* are slot bottom related.

FIGS. 17, 18, and 19 illustrate features of an embodiment on a separated connector with pin 60 and box 61 aligned for axial movement as indicated by arrow 68 to move the thread arrays 62 into slots 61*a*. The same movement moves thread segments 66 into slots 60*a*. To avoid confusion of dotted lines, box end 61 is shown as transparent. All thread segments illustrated were generated as threads with a helix angle typified by line 69. Helical partial or interrupted threads can be provided either by threading or by repeating any one thread segment in each of the remaining arrays of threads. It should be understood that any one axial level of repeat partial threads will start at the same axial location in each array of threads. By contrast, thread-cut interrupted threads will advance axially an amount of the thread pitch, divided by the number of cut-outs. Thread cut arrays suggest that the pin be inserted into the box at only one circumferentially related location. All threads are limited to the length bounded by lines 64 and 65. Thread roots 63 and 67 can be sized to provide a substantially tight fit or even some interference with the crests of the mating thread segments. The strain is minor but it provides a brake effect to stabilize threads subject to shock loading. Any thread flank can be used. If wedge threads of a long taper type are used (note FIG. 31) the thread lands are narrow at the nose end of both components. The narrow lands start in wide grooves and the difference diminishes as the connection is made up.

With interrupted threads, the entire make-up can take a relatively small fraction of a full rotation of the pipe. The number of circumferential arrays of the protuberances or interrupted threads determine the required amount of turn of the male end or pin relative to the female end or box to make the connection. The array is that circumferential area of thread that was not cut away or of the machined protuberances or lugs. With four cut-outs, a thread would produce four thread segments (also referred to as lugs, protuberances, protrusions, and the like) per turn and advance axially one-fourth of the thread pitch. In an embodiment of the present device the entire make-up, of the connection, is achieved in as little as one-twentieth ($\frac{1}{20}$) of a turn and the wedging effect is the same as for long continuous threads. This is a factor of the number of arrays and slots. However, more thread length may be required, to maintain joint strength, because of the amount of threads which are cut away as slots. But the small turn requirement, such as only one-twentieth of a full turn, still remains valid. The additional thread length is gained by having more thread segments in the axial array.

Figure 21:
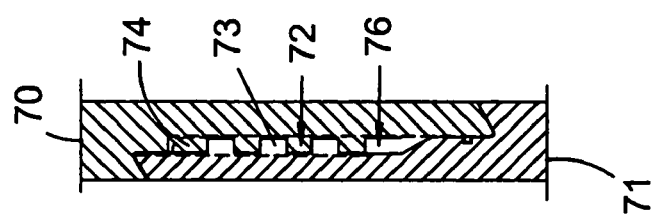
FIG. 21 is a sectional view taken along line 21-21.
Figure 20:
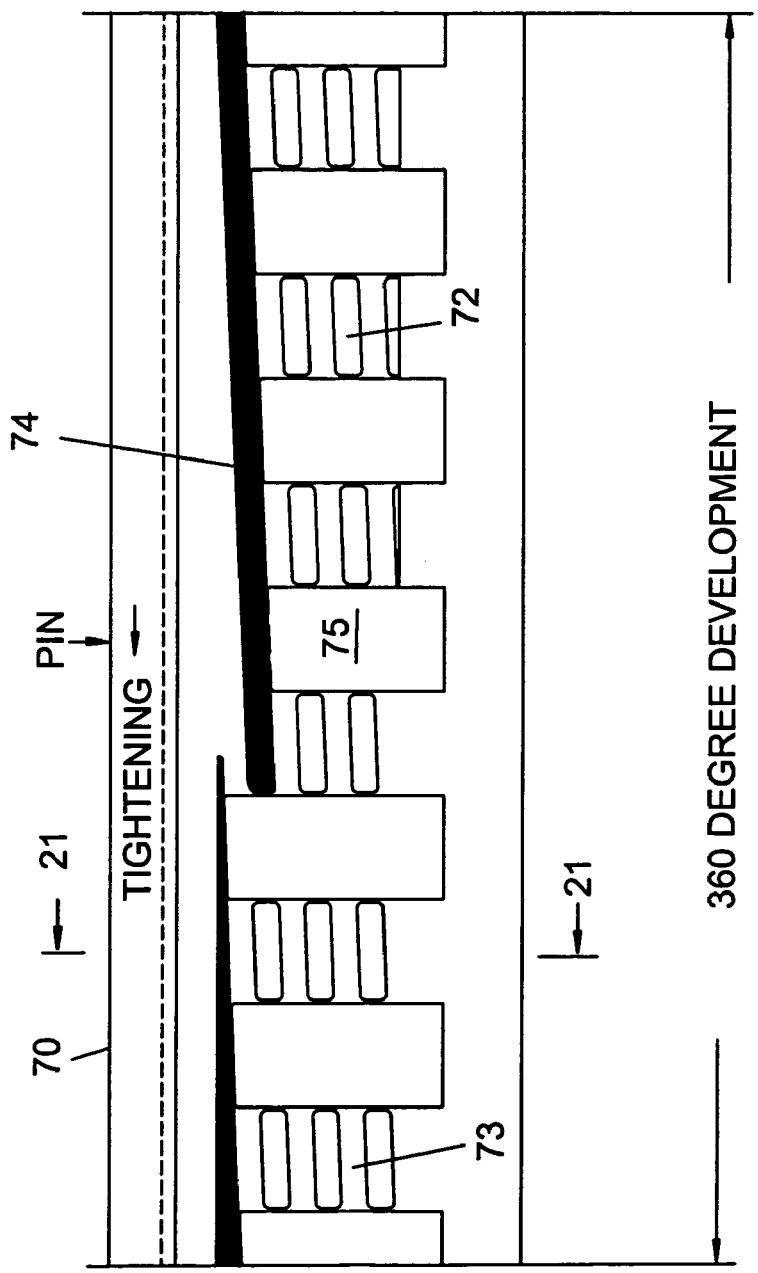
FIG. 20 represents an unfolded plan view of another embodiment of a mated pin and box connection.

FIGS. 20 and 21 illustrate a particular feature of an embodiment but they are otherwise much the same as FIGS. 17, 18, and 19. This is an interrupted thread concept with all wraps of thread cut by slots except the last turn 74 on pin 70. An interrupted thread array is comprised of thread segments 72 which are separated by grooves 73. Slots 75 are of different length because they extend to but do not cut thread wrap 74. The uncut thread provides a landing flank for the thread segments of the mating box 71. When the most distal box threads engage the uncut thread, a box thread will be aligned, for instance, with groove 73. This avoids damage to the driving abutments on the mating parts. Area 76 adjoins a flank that is not loaded.

If preferred, the pin 70 can be oriented such that an array will enter a slot counterclockwise of the slot normally entered. The uncut thread 74 will allow the mating parts to turn the arrays through a slot before entering the target array that pulls the abutting surfaces into final position.

The thread angle can be increased by using double, or multiple, threads in which case more than one thread starts at the same axial position. Thus, if a faster helical angle is needed, an embodiment with multiple threads can be used. More than one thread would start at a selected transverse plane. The resulting plurality of threads would each progress axially a greater amount per turn. If using thread segments not derived from threads, the helical angle can have any practical rate of axial advance relative to circumferential extension.

FIGS. 22-27 pertain to an embodiment with thread configurations similar to most disclosed coupling arrangements. However, these configurations are distinguishable in that the configuration are comprised of thread segments or protuberances instead of the common uninterrupted or continuous thread. To secure the connection to prevent unscrewing threads when hammering the assembly into the earth, optional thread security arrangements can be provided. These arrangements can be applied separately to a particular embodiment or can be combined together on one embodiment. One such action is a tighter fit, including a slight interference between the root and crest of mating partial threads or lugs, between mating elements as tightening rotation occurs. Radial strain which can be caused by an extremely tight fit and which is well within the elastic limit of the material, provides a reversibility of the connection process with externally provided torque. Another such action is provided in the form of a blocking element, preferably a set screw that extends through the wall of the box and into the path that would be traversed by a thread segment if the connection rotates in a direction to loosen the connection. It should be appreciated that the set screw can be used with most embodiments and does not require a particular protuberance shape or any particular type of thread segment. Protuberance 80 on part 83 enters slot 81 on mating part 82 with some clearance between all opposed surfaces. When axial aligned, rotation of part 82 brings thread segment 84 on part 82 into juxtaposition with thread segment 80 on part 83. In this case there are no radial loads between thread crests and opposing thread roots. The embodiment illustrated in FIG. 25 does not show load flanks in contact but that condition will exist during the diving operation.

FIG. 26 illustrates the use of a set screw 85*a* to prevent rotation in a direction for loosening the connection. The set screw 85*a* extends though the wall of part 85 into slot 81 thereby preventing any movement of thread segment 86 in a direction toward the set screw 85*a*.

FIG. 27 illustrates a thread form embodiment wherein there is some interference between the thread segment 86 and the mating body 85. Here the thread roots are sized to interfere with the crests of the mating thread. It should be appreciated that any interference between the crests, of one part, and the roots of the mating part must be sufficiently minor as to be able to accommodate any deflection and/or deformation within the plastic deformation zone of the threads. It should further be understood that such interference and subsequent plastic deformation can be useful in handling large diameter pipe. Such sizes sometimes lose their cylindricity and the deformation, caused by interfering thread elements as described herein, can help the ends maintain a cylindrical cross-section and thus allow for easier mating of the box and pin ends.

Figure 29:
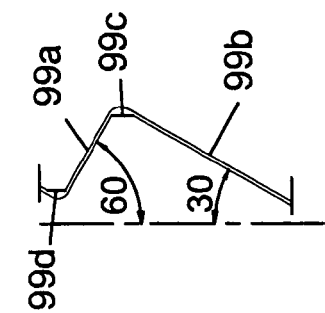
FIGS. 29 and 30 are profiles of one form of buttress thread for connectors.
Figure 30:
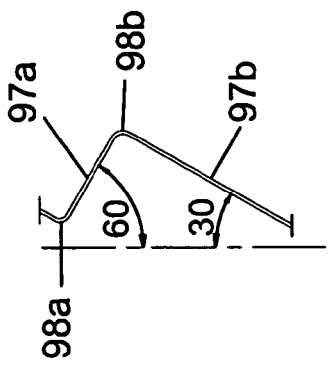
Figure 28:
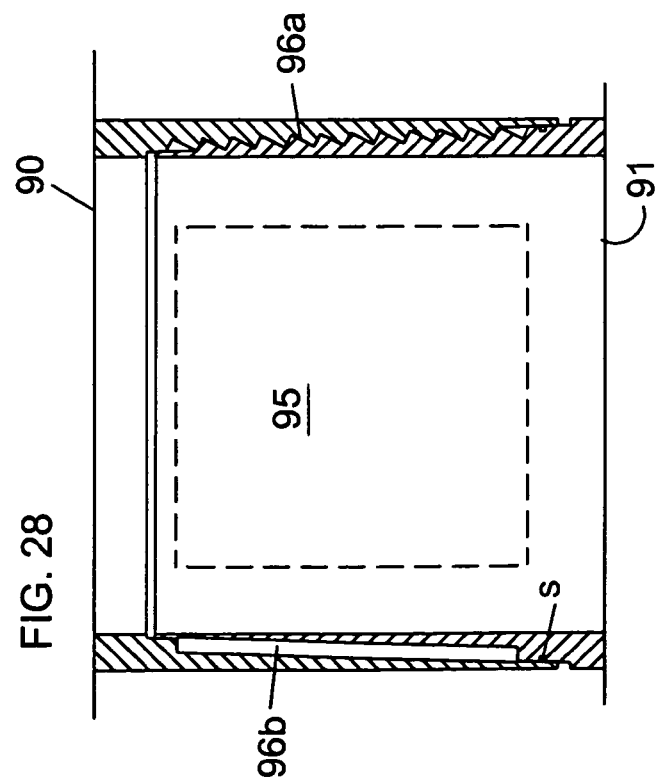
FIG. 28 is a side view cut away of a connector with buttress threads.

FIGS. 28, 29, and 30 illustrate embodiments with a modified wedge thread format that does not depend upon a shoulder-type abutment. The tapered threads provide the torque stop. The threads on FIGS. 28 and 29 are shaped with radii 98*a* and 98*b* on the crests and roots and load flanks 97*b* and stab flanks 97*a* have different angular relationships to the pipe axis. In this thread format the stab flanks are also shock flanks during pile driving. The male and female profiles are the same. FIG. 30 illustrates thread crests 99*c* and 99*d* flattened and, hence, are a more economical arrangement. The angles of flanks 99*a* and 99*b* remain unchanged. It should be understood that the angles shown are illustrative and are not to be construed as limitations.

In FIG. 28, threads 96*a* are cut away in the slot areas 95 only enough, for axial passage of the arrays into the slots. Although shown as an interrupted thread, the arrays can be identical and made up of non-thread protuberances as described herein. Fluid seals can be achieved by mating conical surfaces in unthreaded and unslotted areas. An optional resilient seal is shown as s.

FIG. 31 illustrates an embodiment with a connection similar to that of FIG. 28 but the threads are wedge threads. The long wedge shape brings all thread surfaces into contact on both the stab and load flanks when the connection is torqued together. The entering end of the pin thread is axially narrow and widens and the entering groove on the box is wide and narrows. Such a design is accomplished during the manufacturing stage by making a tight connection, marking the pipe, disconnecting the assembly, and milling the appropriate slot to produce the interrupted threads. When the interrupted threads are again connected, the individual thread segments will wedge or jam, in a partial tightening turn, as they did before cutting/milling the slots. Two shoulders are shown to be abutting but either or both can be gaps. Pin 93 has threads 93*a* that start axially narrow at the nose and broaden with each turn. Box 92 has threads 92*a* that are axially narrow at the start at the nose and widen as the thread progresses axially. By way of explanation, the center of the crest describes a helical line but the flanks progress axially at different helical angles. The crests and root can be made to clear or fit tightly as demanded by the planned operation of the tool. This format can seal by conical surface interference on other than thread areas. An alternate resilient seal is shown as s.

FIGS. 32-34 illustrate embodiments with optional methods for sealing a box nose with an abutment surface that is angled to radially capture the end of the nose. Radius R1 and radius R2 are such that, when they intersect, they will capture and squeeze seal 100. Pin end 71 has conical surface 71*a* that engages a mating surface 70*b* on box end 70 when the connection is made up. The capture angle squeezes the tubular nose radially inward, closing the gap 70*a*. A redundant, or alternate, seal ring 102, in groove 101, also seals the connection. When gap 70*a* closes, the seals are capable of closure against very high pressure. Either, neither, or both of the seals shown may be used with connections disclosed herein.

Figure 37:
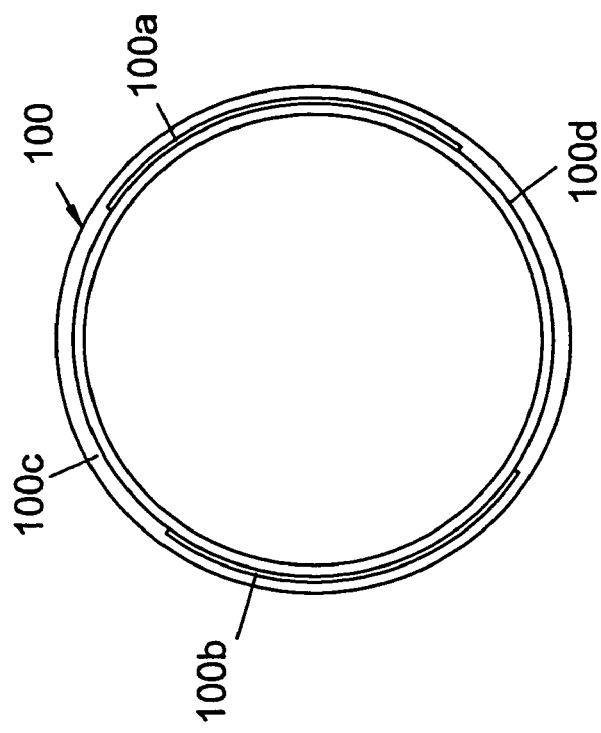
FIG. 37 is an end view, from below, of FIG. 35.
Figure 35:
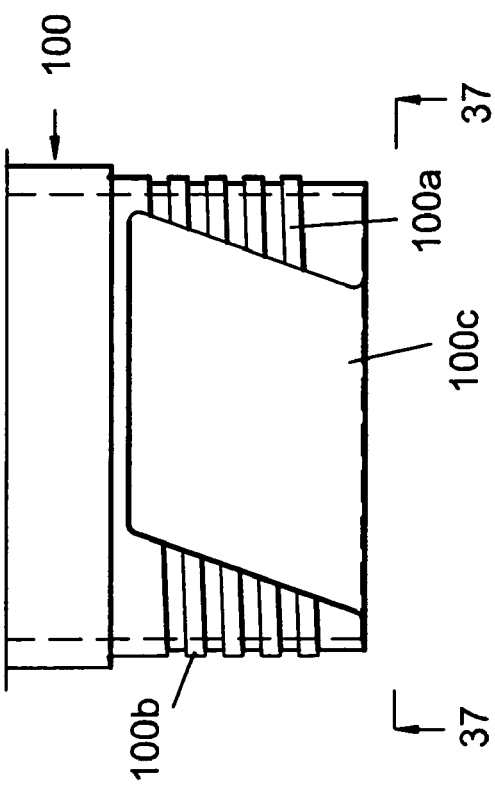
FIG. 35 is a side view of a pin end with spiral slots.
Figure 36:
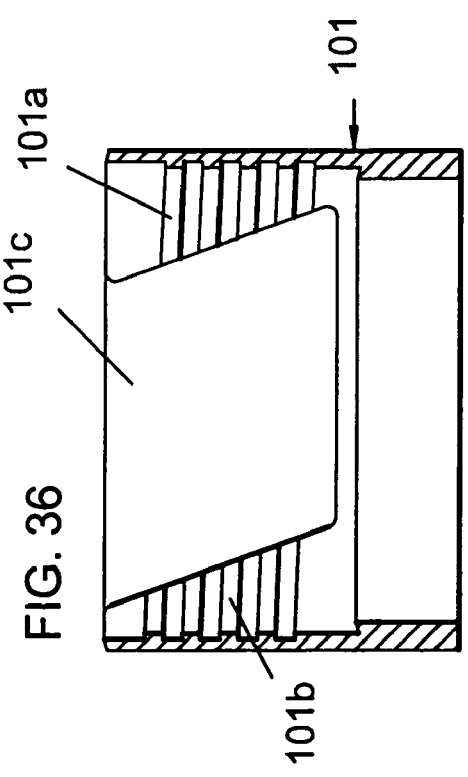
FIG. 36 is a side view of a box, cut away along the centerline, with spiral slots.

FIGS. 35-37 illustrate embodiments with spiral slots separating the interrupted thread arrays that extend in a helical direction. Pipe end 100 has a spiral slot 100*c* separating arrays 100*a* and 100*b*. Pipe end 101 has a spiral slot 101*c* separating arrays 101*a* and 101*b*. FIG. 37 illustrates quarter cut slots which require one quarter turn to bring the arrays into full engagement.

Figure 39:
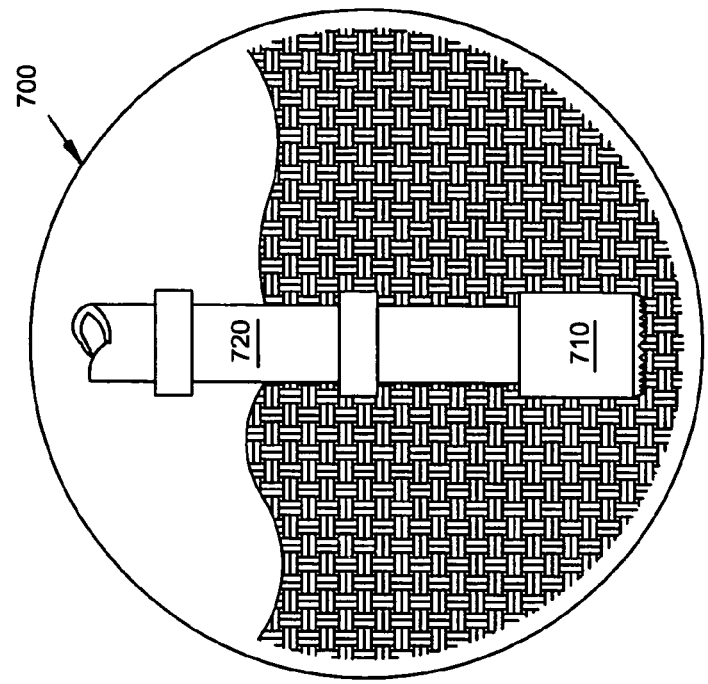
FIG. 39 illustrates a partially cut away view of a coupling.
Figure 38:
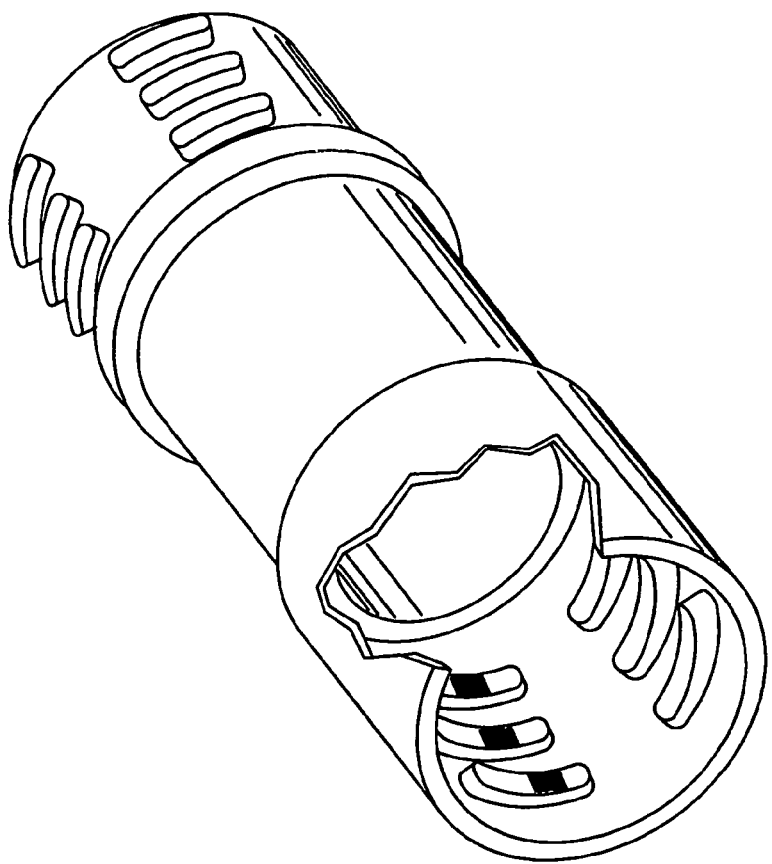
FIG. 38 illustrates the present connection with a drive shoe.

As illustrated in FIG. 39 an embodiment of the present device can have a drive shoe (710) connected to the bottom of the pipe string (720). The drive shoe (710) can be attached to the lowermost pipe by welding, by a threaded connection, or even with the interrupted thread connection. FIG. 38 illustrates yet another embodiment of the present device in the form of a coupling which can also be used, among other things, to connect the drive shoe to the lowermost pipe. The coupling may connect to the upper end of the drive shoe. This connection would preferably be a welded or threaded connection. However, it should be appreciated that the drive shoe and the coupling could also be connected by a variety of methods. The coupling end furthest from the drive shoe, longitudinally, would then have the interrupted thread connection.

The coupling illustrated in FIG. 38 is shown with the interrupted thread connection on both ends. However, it should be appreciated that this coupling could have embodiments with any combination of male and female ends including but not limited to a threaded male end and an interrupted thread female end, a threaded female end and an interrupted thread male end, an interrupted thread female end and an interrupted thread female end, an interrupted thread male end and an interrupted thread male end, an interrupted thread female end and an interrupted thread male end, an interrupted thread male end and a female weld end, a male weld end and an interrupted thread female end, and the like.

The use of a coupling is also advantageous to adapt an existing inventory of pipe which may have already been manufactured to be threaded or welded. In such a case, the coupling could be easily attached to the pipes prior to the delivery of the pipes to the rig, or in an area adjacent to the rig. This method would allow the conversion of such inventory pipe to pipe with the interrupted or slotted thread connection. In order to be able to utilize the majority of the inventory pipe, the coupling would need to be produced with the variety of ends described herein. Thus, a connection could be adapted to fit substantially all pipe including, but not limited to pipes with threaded ends, weld ends, pipes which need to be run pin up, pipes which need to be run pin down, pipes that for any reason already have some other type of end connection and the like.

In use, the pipe ends are preferably produced prior to the pipe being shipped to the drilling rig. Or as described herein, the ends can be attached to the pipes near the rig or couplings could be used and attached to the pipes before shipment to the rig or near the rig. In any case, an objective would be for the pipe ends to be prepared with the interrupted thread or slotted thread ends prior to the time the pipes are needed for driving a pipe string into the ground. Preferably, once the first pipe is substantially in a position requiring the attachment of the next length of pipe, a second pipe is preferably positioned such that the male or pin end of the second pipe is substantially longitudinally aligned with the female or box end of the first pipe. It should be appreciated that if the first pipe has a male end or the pin up then the second pipe must be aligned with the female end or box down. An alternative would be to use a coupling with an end connection selected for the desired mating connections. Preferably, after the first and second pipes are substantially aligned longitudinally, they are preferably aligned such that the arrays of protuberances of one pipe end substantially align with the slots of the other mating pipe end. This alignment can be preferably accomplished by rotation of one of the pipes with respect to the other. Next, preferably the second pipe is moved substantially in a longitudinal direction with respect to the first pipe. When the pipes have substantially fully mated in the longitudinal direction, one pipe is rotated with respect to the other pipe. With any rotation of the one pipe, the connection is complete. The amount of rotation preferably depends on the number of arrays of protuberances and the number of protuberances in each longitudinal column.

From the foregoing, it can be seen that this invention is one well adapted to meet the needs of industry. It will be understood that certain features and sub-combinations are of utility and may be employed without reference to other features and sub-combinations. This is contemplated by and is within the scope of the claims.

As many possible embodiments may be made of the connector of this invention without departing from the scope thereof, it is to be understood that alil matter herein set forth or shown in the accompanying drawings is to be interpreted as illustrative and not in a limiting sense. The foregoing disclosure and description of the invention is illustrative and explanatory thereof, and it will be appreciated by those skilled in the art, that various changes in the size, shape and materials, the use of mechanical equivalents, as well as in the details of the illustrated construction or combinations of features of the various coring elements may be made without departing from the spirit of the invention. The graphic preference for axially directed slots is not to be construed as a limitation.

What is claimed is:

1. A connection for assembly of pipe, the connection comprising:
    a first pipe having a female end;
    a second pipe having a male end;
    said female end having an inner surface, an internal annular shoulder, a nose face and an outer surface;
    said male end having an inner surface, an external annular shoulder, a nose face and an outer surface;
    a first plurality of protuberances circumferentially and longitudinally spaced relative to each other about the inner surface of said female end;
    a second plurality of protuberances circumferentially and longitudinally spaced relative to each other about the outer surface of said male end;
    wherein said circumferential spacing forms a circumferential array comprising at least one longitudinal column on both the inner surface of said female end and the outer surface of said male end;
    said internal annular shoulder and said external annular shoulder being each shaped so as for each said internal shoulder and each said external shoulder to receive a mating nose face, wherein at least one said internal shoulder and/or external shoulder and its corresponding mating nose face are shaped to substantially entrap said nose face within the shoulder to substantially restrain radial movement;
    said plurality of circumferential arrays aligned such that said plurality of protuberances are accepted by a mating pipe end when said male and female pipe ends move longitudinally relative to each other for forming a connection,
    wherein the male and female ends engage upon any rotation of one pipe relative to the other pipe wherein such rotation causes said protuberances of the male end and said protuberances of the female end to move circumferentially with respect to each other, and wherein the nose face of the male end engages the internal annular shoulder of the female end and the nose face of the female end engages the external annular shoulder of the male end such that compressive loads on the male end and the female end are borne substantially by the shoulders; and
    at least one and/or both of said first and second protuberances embodies at least one interference dimension that causes the protuberance to displace a mating protuberance surface.

2. The connection according to claim 1 wherein said plurality of arrays comprises an odd number of said arrays.

3. The connection according to claim 2 wherein an odd number of arrays provides a positive determination of a circumferential starting point for engaging the respective protuberances of the male and female ends.

4. The connection according to claim 1 wherein said connection is used for connecting pipe, which is being driven into the earth.

5. The connection according to claim 1 wherein said female end and said male end are produced at the end of separate rings, and wherein said separate rings are attached to said first pipe and said second pipe.

6. The connection according to claim 5 wherein said separate rings are attached by welding.

7. The connection according to claim 1 wherein at least some of said protuberances are shaped to be radially captured to prevent radial expansion of the female end relative to the male end.

8. The connection according to claim 1 wherein the protuberances are produced by at least one screw thread on said male end and a mating thread arrangement in said female end wherein all said threads are interrupted by slots.

9. The connection according to claim 1 wherein the arrays of protuberances have at least some lead angle wherein mating of the protuberances, of the respective female and male ends, causes further longitudinal movement and resists free rotation in a direction opposite of the rotation direction for engagement.

10. The connection according to claim 1 wherein the arrays of protuberances have no lead angle.

11. The connection according to claim 1 wherein the protuberances are axially pre-loaded as a result of dimensional relationships and the rotation of one pipe relative to the other pipe.

12. The connection according to claim 1 wherein at least one protuberance in said arrays of protuberances is engagable by another protuberance to limit said rotation of one pipe relative to the other pipe.

13. The connection according to claim 1 wherein the protuberances are substantially wedged shaped.

14. The connection according to claim 1 wherein said circumferential arrays form an interrupted taper thread.

15. The connection according to claim 1 wherein said circumferential arrays form an interrupted straight thread.

16. The connection according to claim 1 wherein at least one conical surface on said first pipe end is engaged and force loaded by a mating surface on said second pipe end when the connection is made up.

17. The connection according to claim 16 wherein said at least one conical surface is shaped to accept at least one seal when the connection is made up.

18. A method of making a connection comprising:
providing a first pipe having at least one female end, said female end having an inner surface, an internal annular shoulder, a nose face, and an outer surface;
providing a second pipe having a at least one male end, said male end having an inner surface said male end having an inner surface, an external annular shoulder, a nose face and an outer surface;
providing a first plurality of protuberances circumferentially and longitudinally spaced relative to each other about the inner surface of said female end;
providing a second plurality of protuberances circumferentially and longitudinally spaced relative to each other about the outer surface of said male end;
wherein said circumferential spacing forms a circumferential array comprising at least one longitudinal column on both the inner surface of said female end and the outer surface of said male end, and wherein said internal annular shoulder and said external annular shoulder being each shaped so as for each said internal shoulder and each said external shoulder to receive a mating nose face, wherein at least one said internal shoulder and/or external shoulder and its corresponding mating nose face are shaped to substantially entrap said nose face within the shoulder to substantially restrain radial movement;
aligning said first pipe and said second pipe such that the female end of said first pipe is aligned to receive the male end of said second pipe;
further aligning said first pipe and said second pipe wherein said plurality of circumferential arrays are aligned such that said first plurality of protuberances, are accepted by a mating pipe end when the pipe ends move longitudinally relative to each other for forming a connection;
providing longitudinal movement wherein said male end will enter and mate with said female end;
continuing longitudinal movement until said male end is fully engaged in said female end;
rotating one pipe with respect to the other pipe wherein said rotation causes the protuberances of the male and female ends to move circumferentially with respect to each other and wherein the male and female ends engage each other; and
pulling the corresponding internal shoulder and its mating nose face and the external shoulder and its mating nose face into contact, with each other by engagement of the male and female protuberances upon said rotation of one pipe relative to the other pipe, wherein said internal shoulder and its corresponding mating nose face and said external shoulder and its corresponding mating nose face are distinct from surfaces of said protuberances, and wherein the contact of the shoulders and the mating nose faces causes compressive loads on the male end and the female end to be borne substantially by the shoulders.

19. The method of claim 18, wherein the rotation of one pipe segment with respect to the other pipe segment is less than 20 degrees.

20. The method of claim 18, wherein said connection is used for connecting pipe, which is being driven into the earth.

* * * * *